(12) United States Patent
Ford

(10) Patent No.: US 7,037,458 B2
(45) Date of Patent: May 2, 2006

(54) PROGRESSIVE STAMPING APPARATUS AND METHOD

(75) Inventor: Stanley Ford, Queen Creek, AZ (US)

(73) Assignee: Intel Corporation, Santa Clara, CA (US)

( * ) Notice: Subject to any disclaimer, the term of this patent is extended or adjusted under 35 U.S.C. 154(b) by 278 days.

(21) Appl. No.: 10/693,032

(22) Filed: Oct. 23, 2003

(65) Prior Publication Data

US 2005/0087911 A1    Apr. 28, 2005

(51) Int. Cl.
*B29C 59/02* (2006.01)
(52) U.S. Cl. ........................... 264/293; 425/385
(58) Field of Classification Search ............... 425/385; 264/293
See application file for complete search history.

(56) References Cited

U.S. PATENT DOCUMENTS

| 3,115,678 | A | * | 12/1963 | Keen ......................... 425/343 |
| 4,761,253 | A | * | 8/1988 | Antes ......................... 425/385 |
| 5,176,922 | A | * | 1/1993 | Balsano et al. ............... 425/89 |
| 6,048,191 | A | * | 4/2000 | Beltrami ..................... 425/89 |
| 6,444,500 | B1 | * | 9/2002 | Shinma ....................... 438/127 |
| 6,563,207 | B1 | * | 5/2003 | Shinma ....................... 425/89 |

FOREIGN PATENT DOCUMENTS

EP    1068945 A2 *  1/2001
FR    2642458 A  *  8/1990

* cited by examiner

*Primary Examiner*—Robert B. Davis
(74) *Attorney, Agent, or Firm*—Buckley, Maschoff & Talwalkar LLC

(57) ABSTRACT

In some embodiments, an apparatus includes a first stamp to apply pressure to a mold at a first portion of the mold, and a second stamp to apply pressure to the mold at a second portion of the mold that is adjacent to the first portion of the mold.

19 Claims, 7 Drawing Sheets

PROGRESSIVE STAMPING APPARATUS AND METHOD

BACKGROUND

It is known to mount integrated circuits on circuit boards via items known as "interposers". The function of an interposer is to provide a signal interface between a silicon (or other semiconductor) die and a feature such as a socket on a circuit board.

A typical interposer includes one or more metal (e.g. copper) layers and one or more plastic layers. The plastic layer or layers may be quite intricate, with numerous fine features.

As part of a typical technique for manufacturing interposers, a stamping process is applied to a substrate. The substrate may be in the shape of a disk that has a lower, relatively thick layer formed of copper, with an upper layer of moldable plastic formed on the copper. A mold having fine features is impressed on the plastic layer by a stamping mechanism. Over the face of the disk, the mold may impress a repeating pattern, and each instance of the pattern may correspond to an individual one of the interposers to be formed from the disk. After other steps subsequent to molding (e.g., etching and/or laser-trimming, trace-line filling, etc.), the disk may be sawn into pieces to free the individual interposer pieces.

During the stamping process, one problem that may be encountered is trapping of air or excess plastic material at various localities of the mold/substrate. Trapped air or excess material may deform features to be impressed on the substrate, thereby reducing the yield of interposer pieces from the substrate disk.

In some cases, to avoid the problem of trapped air, the stamping process may be performed in vacuum. However, this may increase the cost or difficulty of performing the stamping process. For example, if the stamping is performed in vacuum, it is not possible to retain the mold on the stamping press head by applying vacuum to the mold through the press head.

It is also known to include channels or the like in the mold pattern to allow excess material and/or air to flow away from localities at which it might otherwise be trapped. The presence of such channels occupies space that could otherwise be used for features of the interposer pieces, and thus increases the scale of the interposer pieces and/or reduces the number of interposer pieces that can be produced from a single substrate disk. Accordingly, use of such channels may increase the cost of manufacturing the interposers.

DETAILED DESCRIPTION

Figure 1:
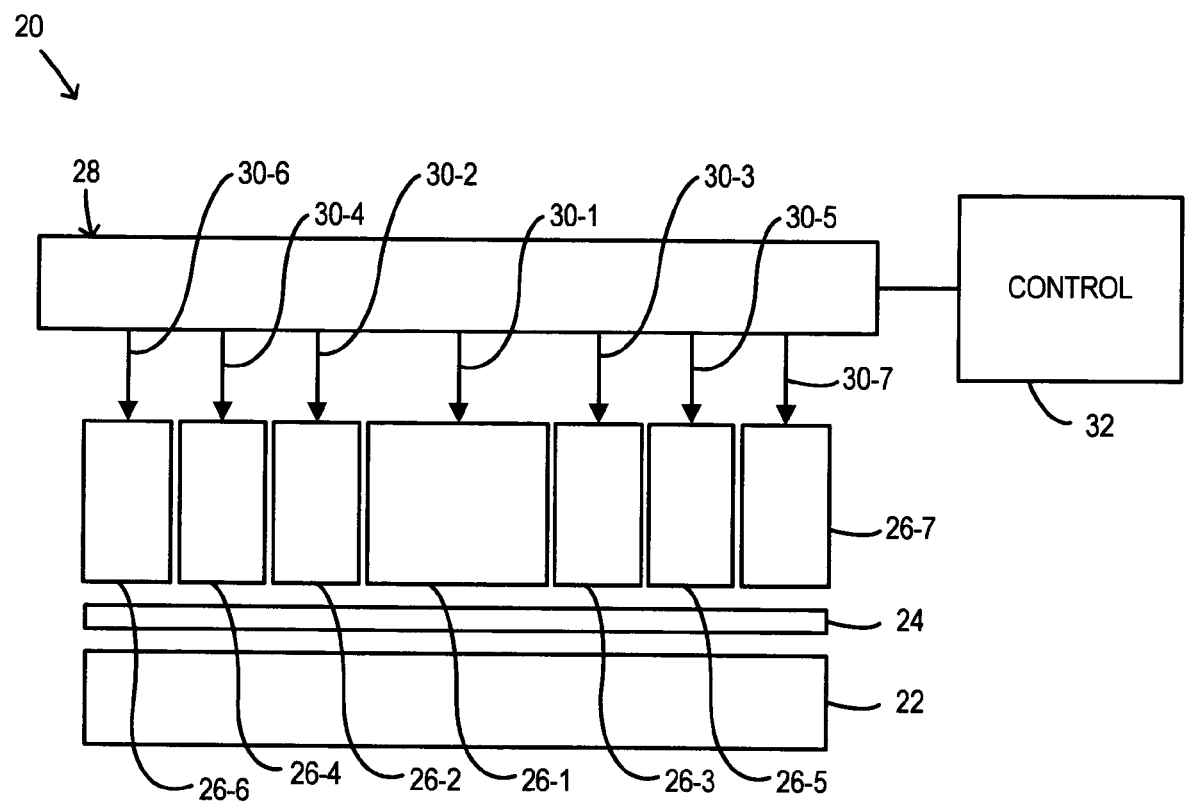
FIG. 1 is a schematic side cross-sectional view of a stamping apparatus according to some embodiments.

FIG. 1 is a schematic side cross-sectional view of a stamping apparatus 20 according to some embodiments. Reference numeral 22 indicates a substrate upon which a stamping process may be performed by the stamping apparatus 20. The substrate 22 may be provided in accordance with conventional principles, and may comprise, for example, a copper/plastic disk, with the plastic layer (not separately shown in FIG. 1) above the copper layer (not separately shown in FIG. 1). The plastic layer may be formed of a suitable moldable material, such as a polymer (e.g., liquid crystal polymer (LCP)) or ABF (Ajinomoto buildup film). For example, ABF type GX3 may be used. In some embodiments the plastic layer may have a thickness of about 1 mm. The substrate as a whole may have a diameter of about 150 mm in some embodiments. Other sizes and/or types of substrates may be used.

Reference numeral 24 indicates a mold which may be employed to impress a pattern on the plastic layer of the substrate 22. The mold may be of the type referred to as a "micro-tool", and may contain a "negative" pattern on its lower surface corresponding to the positive pattern to be impressed on the plastic layer of the substrate 22. The mold 24 may be generally disk shaped, save for the features or pattern on the lower surface of the mold 24. In some embodiments the mold 24 may be formed of stainless steel with a thickness of about 300 to 400 microns. The mold 24 may be somewhat flexible. As will be seen, the flexible nature of the mold 24 may allow for a stamping process which reduces or eliminates trapping of air and/or excess moldable material. The mold 24 may be considered to be part of the stamping apparatus 20.

The stamping apparatus 20 also includes a plurality of stamps or press heads (schematically represented by blocks 26-1 to 26-7). The stamps 26 are provided to apply pressure to respective portions of the upper surface of the mold 24 according to a sequence of pressing operations as described below. Further included in the stamping apparatus 20 may be a hydraulic system 28, which has actuators (schematically represented by arrows 30-1 to 30-7) for individually actuating respective ones of the stamps 26 in a downward direction. The stamping apparatus 20 may also include a control module 32, which may be coupled to the hydraulic system 28 to control operation of the hydraulic system so that the stamps 26 are downwardly actuated in a desired sequence. The control module may include, for example, a suitably programmed computer and/or microprocessor (not separately shown).

Although the stamps 26-1 to 26-7 are indicated as separate in the view of FIG. 1, at least some of the stamps 26-1 to 26-7 may be combined with one or more others of the stamps 26-1 to 26-7. For example, the blocks 26-2 and 26-3 may represent respective portions of a single stamp (which may be referred to as stamp 26-2/3) that may wrap around stamp 26-1. Similarly, the blocks 26-4 and 26-5 may represent respective portions of a single stamp (which may be referred to as stamp 26-4/5) that may wrap around stamp 26-2/3. Also, the blocks 26-6 and 26-7 may represent respective portions of a single stamp (which may be referred to as stamp 26-6/7) that may wrap around stamp 26-4/5. By the same token, actuators 30-2 and 30-3 may be ganged together to actuate the stamp 26-2/3, or may be a single actuator. Actuators 30-4 and 30-5 may be ganged together to actuate the stamp 26-4/5, or may be a single actuator. Actuators 30-6 and 30-7 may be ganged together to actuate the stamp 26-6/7, or may be a single actuator.

Figure 2:
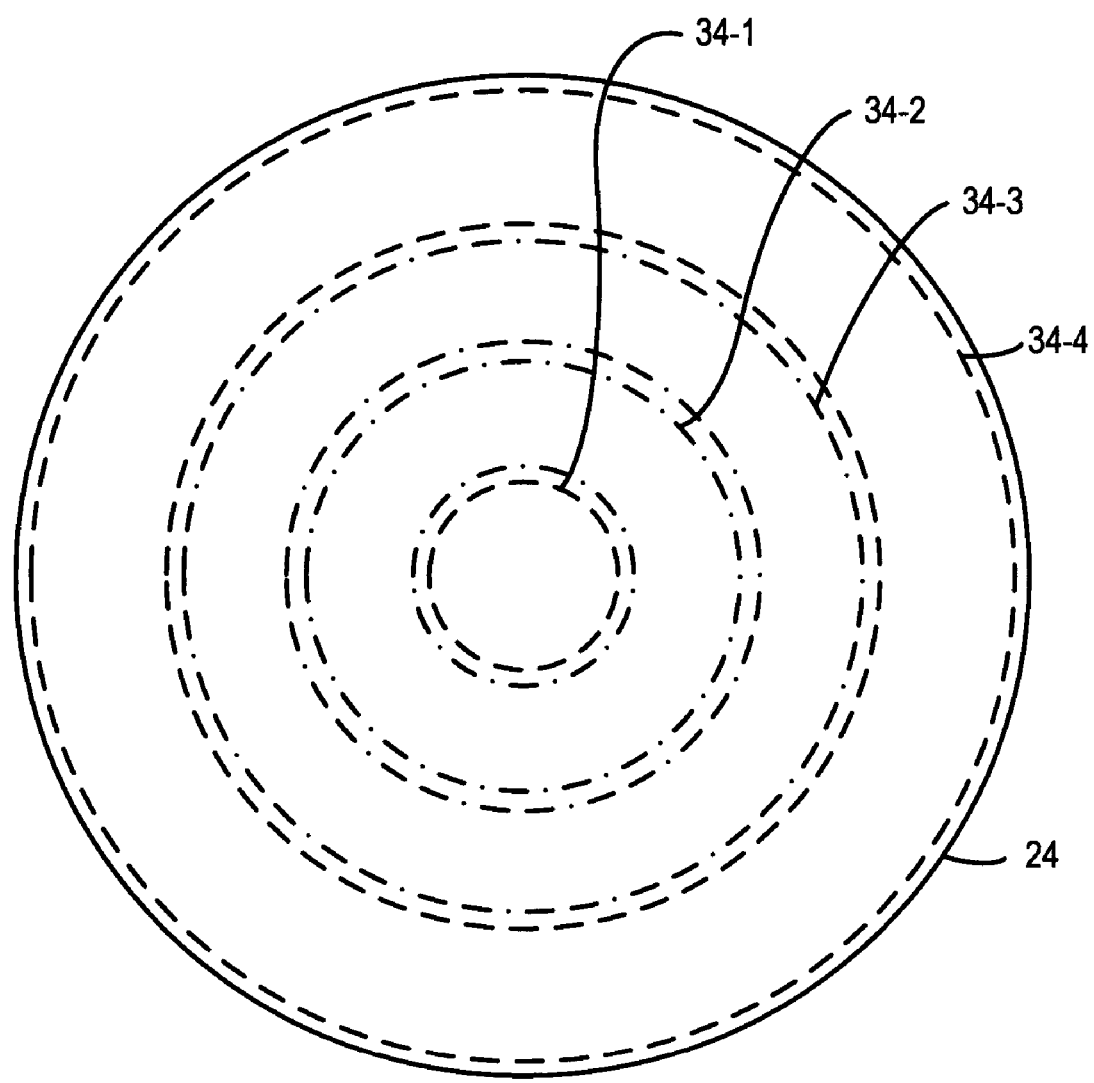
FIG. 2 is a schematic plan view showing a mold by which a stamping operation may be performed together with footprints of individual stamps that may be part of the apparatus of FIG. 1 according to some embodiments.

FIG. 2 is a schematic plan view showing the mold 24 in conjunction with footprints of the stamps 26 (FIG. 1; not shown in FIG. 2) as provided in accordance with some embodiments. In particular, and continuing to refer to FIG. 2, the dashed line circle 34-1 represents the footprint of the stamp 26-1 according to some embodiments. The dashed line circle 34-1 may also be considered to represent a portion of the mold 24 to which the stamp 26-1 may apply pressure upon downward actuation of the stamp 26-1.

The annular region defined by dash-dot lines and indicated by reference numeral 34-2 in FIG. 2 represents the footprint of the stamp 26-2/3 according to some embodiments. It will be noted that the footprint 34-2 surrounds the footprint 34-1 of the stamp 26-1. The region indicated at 34-2 may also be considered to represent a portion of the mold 24 to which the stamp 26-2/3 may apply pressure upon downward actuation of the stamp 26-2/3.

The annular region defined by double-dash-dot lines and indicated by reference numeral 34-3 in FIG. 2 represents the footprint of the stamp 26-4/5 according to some embodiments. It will be noted that the footprint 34-3 surrounds the footprint 34-2 of the stamp 26-2/3. The region indicated at 34-3 may also be considered to represent a portion of the mold 24 to which the stamp 26-4/5 may apply pressure upon downward actuation of the stamp 26-4/5.

The annular region defined by dashed lines and indicated by reference numeral 34-4 in FIG. 2 represents the footprint of the stamp 26-6/7 according to some embodiments. It will be noted that the footprint 34-4 surrounds the footprint 34-3 of the stamp 26-4/5. The region indicated at 34-4 may also be considered to represent a portion of the mold 24 to which the stamp 26-6/7 may apply pressure upon downward actuation of the stamp 26-6/7.

Figure 3:
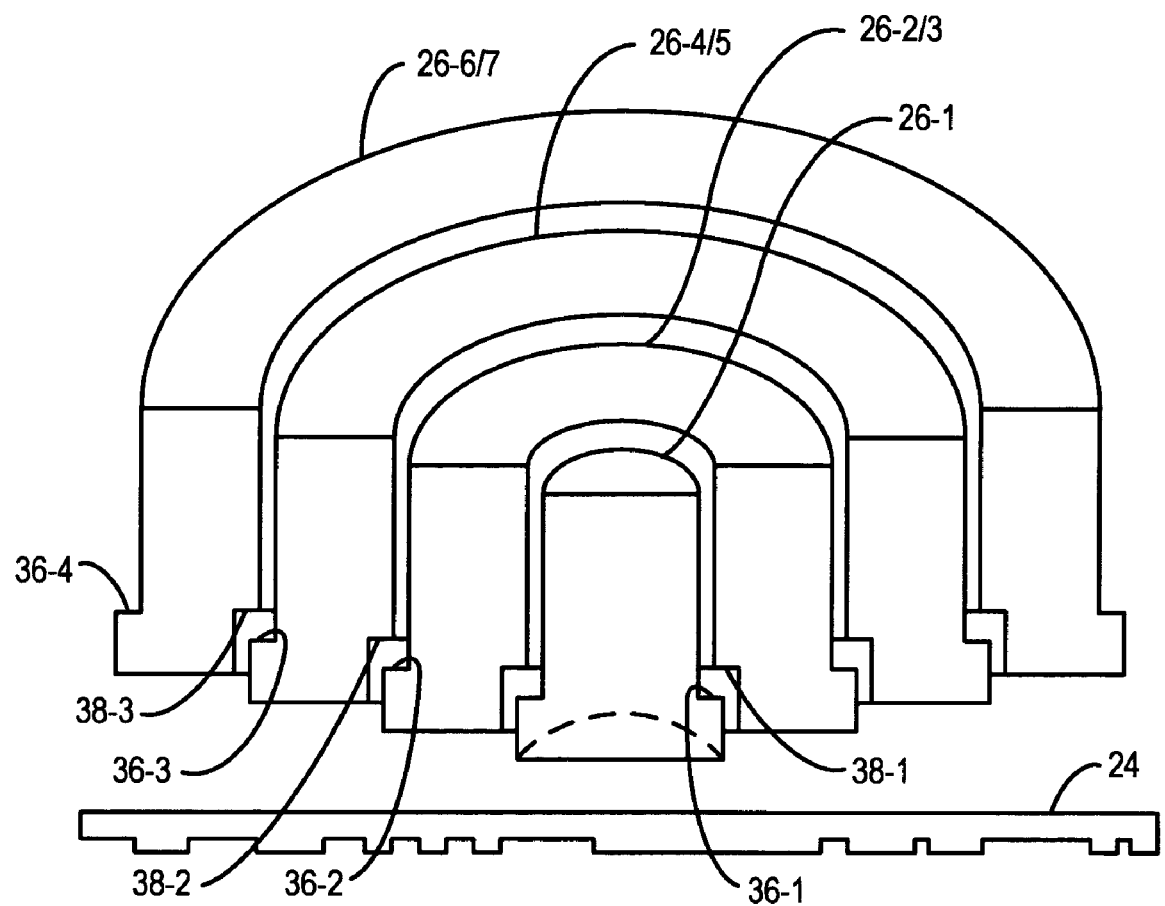
FIG. 3 is a schematic cutaway isometric view showing cross-sections of the individual stamps of the apparatus of FIG. 1 according to some embodiments.

FIG. 3 is a schematic cutaway isometric view showing cross-sections of the individual stamps 26 of the stamping apparatus 20 according to some embodiments. The stamps 26 as shown in FIG. 3 may have the footprints 34 shown in FIG. 2. Accordingly, in the cutaway view of FIG. 3, it will be understood that only about half of each stamp 26 is shown. The mold 24 is also shown.

It will be observed from FIG. 3 that the stamp 26-1, which has a generally circular footprint, also includes a step 36-1 that extends outwardly from the side of the stamp 26-1. The step 36-1 may be continuously provided around the circumference of the lower end of the stamp 26-1.

Furthermore, the stamp 26-2/3 has a generally annular footprint (as seen at 34-2 in FIG. 2), and surrounds the stamp 26-1. The stamp 26-2/3 also has an overhang 38-1 (FIG. 3) which extends from the inner side of the stamp 26-2/3 toward the stamp 26-1. The overhang 38-1 of the stamp 26-2/3 may extend around the entire inner circumference of the lower end of the stamp 26-2/3. The overhang 38-1 is positioned to contact from above the top surface of the step 36-1 of the stamp 26-1 when the stamp 26-2/3 is actuated in a downward direction.

The stamp 26-2/3 also has a step 36-2 that extends outwardly from the outer side of the stamp 26-2/3. The step 36-2 may be continuously provided around the outer circumference of the lower end of the stamp 26-2/3.

The stamp 26-4/5 has a generally annular footprint (as seen at 34-3 in FIG. 2), and surrounds the stamp 26-2/3. The stamp 26-4/5 also has an overhang 38-2 (FIG. 3) which extends from the inner side of the stamp 26-4/5 toward the stamp 26-2/3. The overhang 38-2 of the stamp 26-4/5 may extend around the entire inner circumference of the lower end of the stamp 26-4/5. The overhang 38-2 is positioned to contact from above the top surface of the step 36-2 of the stamp 26-2/3 when the stamp 26-4/5 is actuated in a downward direction.

The stamp 26-4/5 also has a step 36-3 that extends outwardly from the outer side of the stamp 26-4/5. The step 36-3 may be continuously provided around the outer circumference of the lower end of the stamp 26-4/5.

The stamp 26-6/7 has a generally annular footprint (as seen at 34-4 in FIG. 2), and surrounds the stamp 26-4/5. The stamp 26-6/7 also has an overhang 38-3 (FIG. 3) which extends from the inner side of the stamp 26-6/7 toward the stamp 26-4/5. The overhang 38-3 of the stamp 26-6/7 may extend around the entire inner circumference of the lower end of the stamp 26-6/7. The overhang 38-3 is positioned to contact from above the top surface of the step 36-3 of the stamp 26-4/5 when the stamp 26-6/7 is actuated in a downward direction.

The stamp 26-6/7 may also have a step 36-4 (as illustrated in FIG. 3), or alternatively, the outer surface of the stamp 26-6/7 may be substantially vertical (not interrupted by a step).

The heights of all of the steps 36 may be substantially equal, and the overhangs 38 may all emerge at a substantially equal height from the lower surfaces of the stamps 26-2/3, 26-4/5 and 26-6/7. The height at which the overhangs 38 emerge from their respective stamps 26 may be substantially equal to the height of the steps 36.

Figure 4:
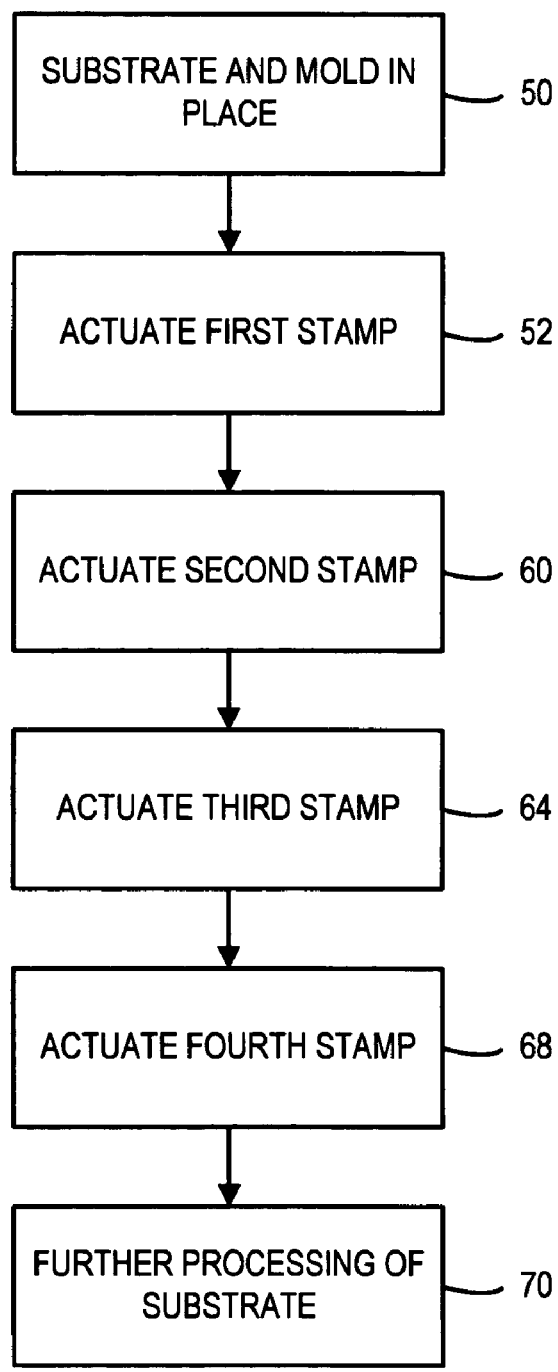
FIG. 4 is a flow chart that illustrates a stamping process that may be performed by the apparatus of FIG. 1 according to some embodiments.

FIG. 4 is a flow chart that illustrates a stamping process that may be performed by the stamping apparatus 20 according to some embodiments. Initially, as indicated at 50 in FIG. 4, the substrate 22 and the mold 24 are in place below the stamps 26 of the stamping apparatus 20. In some embodiments the mold 24 may be retained in place on the stamp 26-1 by vacuum applied through the stamp 26-1. Alternatively, guide pins (not shown) may be provided extending up through both the substrate 22 and the mold 24 to retain the mold 24 in place on the substrate 22 and to prevent movement of the mold 24 in a horizontal direction relative to the substrate 22.

Figure 5:
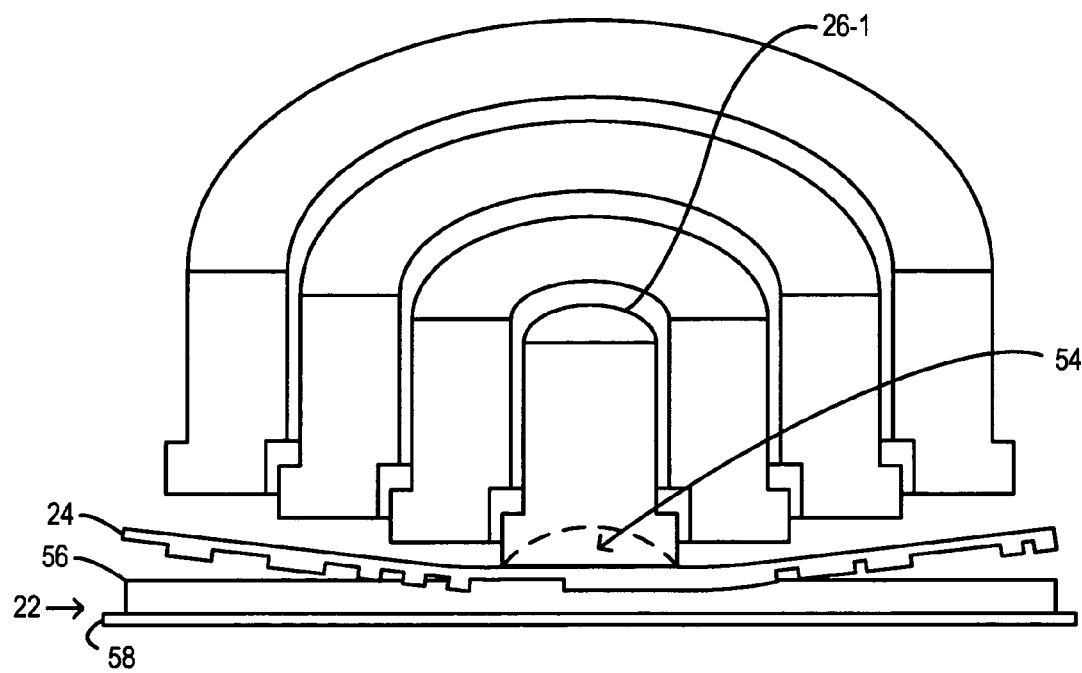
FIGS. 5–8 are views similar to FIG. 3 (but also showing the substrate of FIG. 2) that illustrate various stages of the process of FIG. 4.

With the substrate 22 and the mold 24 in place below the stamping apparatus 20, the control module 32 controls the hydraulic system 28 to downwardly actuate the stamp 26-1 via the actuator 30-1, as indicated at 52 in FIG. 4 and as illustrated in FIG. 5. As a result of the downward actuation of the stamp 26-1, the stamp 26-1 applies pressure to the upper surface of the mold 24 at the portion of the mold 24 indicated at 34-1 in FIG. 2. This is at or near the center of the mold 24, which may be bowed downwardly at its center by the pressure from stamp 26-1, as indicated at 54 in FIG. 5. (The bowing of the mold 24 may be somewhat exaggerated in the drawing for the purpose of illustration.) The lower surface of the mold 24 is pressed into the plastic layer 56 of the substrate 22 at the locus of the stamp 26-1 (at mold portion 34-1, FIG. 2) to begin forming the desired features in the plastic layer 56. Excess material from the plastic layer 56 and/or air are free to move outwardly away from the locus of the stamp 26-1. (The copper layer 58 of the substrate 22 is also shown in FIG. 5.)

Figure 6:
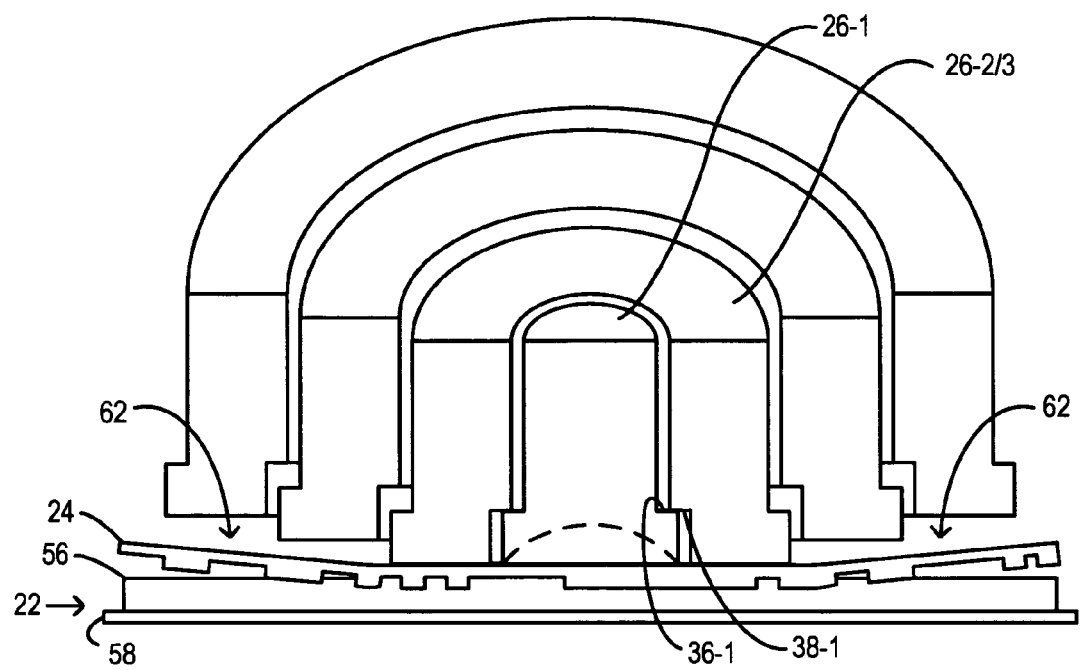

After actuation of the stamp 26-1 and pressing of the stamp 26-1 against the top surface of the mold 24, the control module 32 further controls the hydraulic system 28 to downwardly actuate the stamp 26-2/3 via the actuators 30-2, 30-3, as indicated at 60 in FIG. 4 and as illustrated in FIG. 6. As a result of the downward actuation of the stamp 26-2/3, the stamp 26-2/3 applies pressure to the upper surface of the mold 24 at the portion of the mold 24 indicated at 34-2 in FIG. 2. This is in the annular area surrounding the portion 34-1 of the mold 24 to which the stamp 26-1 applies pressure. Also as a result of the downward actuation of the stamp 26-2/3, the lower surface of the overhang 38-1 of the stamp 26-2/3 comes into contact with the upper surface of the step 36-1 of the stamp 26-1 to limit downward motion of the stamp 26-2/3 so that the respective lower surfaces of the stamps 26-1 and 26-2/3 are substantially aligned with each other in a horizontal plane. As a result, the stamping apparatus, at this stage, applies substantially uniform pressure to the mold 24 across the loci of the stamps 26-1 and 26-2/3. The upper surface of the mold 24 may be substantially flat in this region but may bow upwardly outside of this region as indicated at arrows 62 in FIG. 6. Excess material from the plastic layer 56 and/or air (including excess plastic and/or air displaced by the stamp 26-1) are free to move outwardly from the locus of the stamp 26-2/3.

Figure 7:
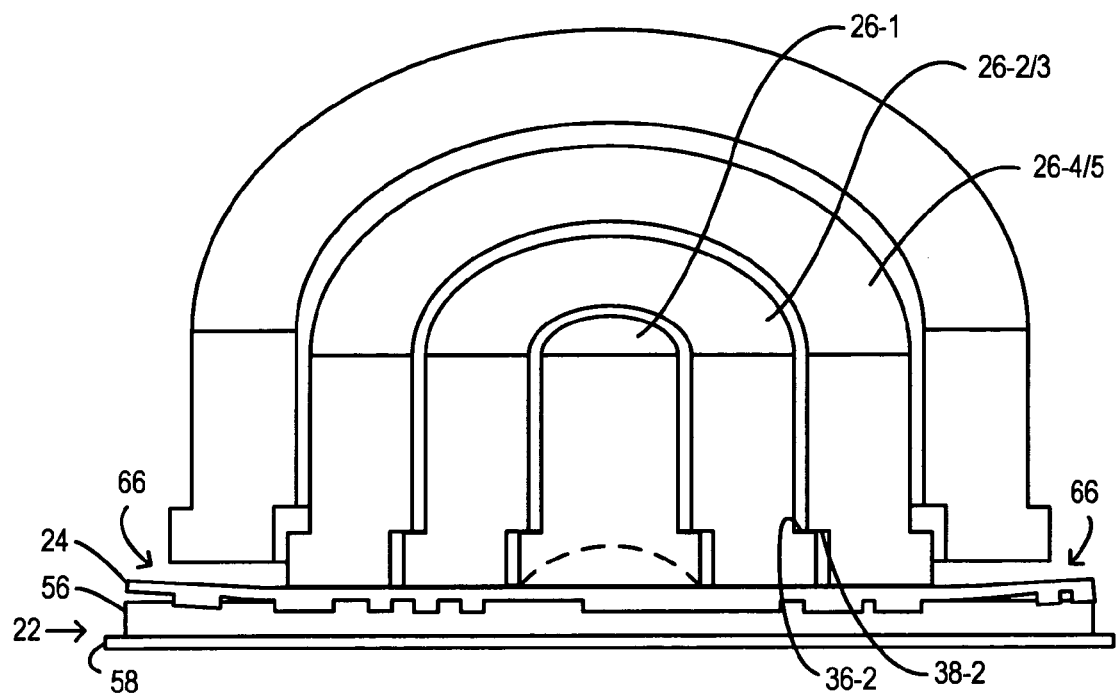

After actuation of the stamp 26-2/3 and pressing of the stamp 26-2/3 against the top surface of the mold 24, the control module 32 further controls the hydraulic system 28 to downwardly actuate the stamp 26-4/5 via the actuators 30-4, 30-5, as indicated at 64 in FIG. 4 and as illustrated in FIG. 7. As a result of the downward actuation of the stamp 26-4/5, the stamp 26-4/5 applies pressure to the upper surface of the mold 24 at the portion of the mold 24 indicated at 34-3 in FIG. 2. This is in the annular area surrounding the portion 34-2 of the mold 24 to which the stamp 26-2/3 applies pressure. Also as a result of the downward actuation of the stamp 26-4/5, the lower surface of the overhang 38-2 of the stamp 26-4/5 comes into contact with the upper surface of the step 36-2 of the stamp 26-2/3 to limit downward motion of the stamp 26-4/5 so that the respective lower surfaces of the stamps 26-1, 26-2/3 and 26-4/5 are all substantially aligned with each other in a horizontal plane. As a result, the stamping apparatus, at this stage, applies substantially uniform pressure to the mold 24 across the loci of the stamps 26-1, 26-2/3 and 26-4/5. The upper surface of the mold 24 may be substantially flat in this region but may bow upwardly outside of this region as indicated at arrows 66 in FIG. 7. Excess material from the plastic layer 56 and/or air (including excess plastic and/or air displaced by the stamps 26-1, 26-2/3) are free to move outwardly from the locus of the stamp 26-4/5.

Figure 8:
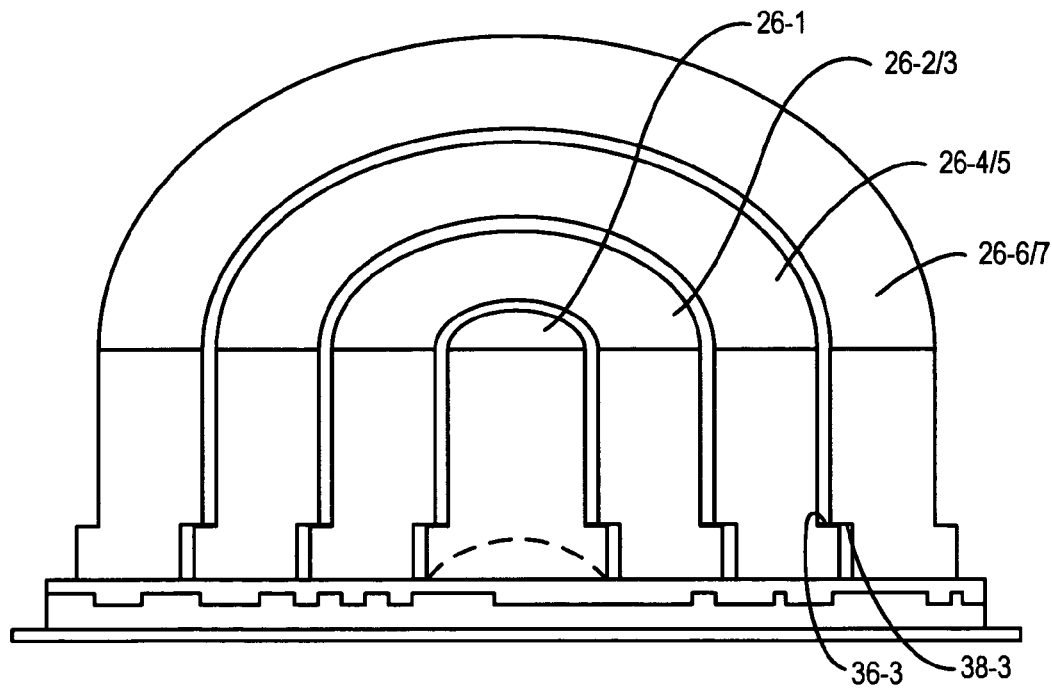

After actuation of the stamp 26-4/5 and pressing of the stamp 26-4/5 against the top surface of the mold 24, the control module 32 further controls the hydraulic system 28 to downwardly actuate the stamp 26-6/7 via the actuators 30-6, 30-7, as indicated at 68 in FIG. 4 and as illustrated in FIG. 8. As a result of the downward actuation of the stamp 26-6/7, the stamp 26-6/7 applies pressure to the upper surface of the mold 24 at the portion of the mold 24 indicated at 34-4 in FIG. 2. This is in the annular area surrounding the portion 34-3 of the mold 24 to which the stamp 26-4/5 applies pressure. This may also be at the periphery of the mold 24 and of the substrate 22. Also as a result of the downward actuation of the stamp 26-6/7, the lower surface of the overhang 38-3 of the stamp 26-6/7 comes into contact with the upper surface of the step 36-3 of the stamp 26-4/5 to limit downward motion of the stamp 26-6/7 so that the respective lower surfaces of the stamps 26-1, 26-2/3, 26-4/5 and 26-6/7 are all substantially aligned with each other in a horizontal plane. As a result, the stamping apparatus, at this stage of the stamping process, applies substantially uniform pressure to the mold 24 all across the mold 24, and the upper surface of the mold 24 may be substantially flat all the way across. Any excess plastic material and/or air, which may have migrated outwardly during the course of the progressive stamping operation portrayed in FIGS. 4–8, may be expelled to the edges of the substrate 22 where such excess material and/or air would not interfere with formation of interposer pieces.

Although not indicated in FIG. 4, heating of the mold 24 may occur while pressure is applied to the mold, to aid in causing the plastic to flow into and through mold features.

After actuation of the stamp 26-6/7 and pressing of the stamp 26-6/7 against the top surface of the mold 24, further processing of the substrate may occur (as indicated at 70 in FIG. 4) in accordance, e.g., with conventional principles. For example, the mold and the substrate may be allowed to cool for a time (e.g., around 15 minutes), then the stamps 26 may be released, and the substrate 22 may be released from the mold 24. Further processing of the substrate 22 may occur, including where appropriate etching or laser cutting of portions of the plastic layer down to the copper layer, formation of vias, filling of copper line-traces, and so forth. In some embodiments, the substrate may be assembled in two or more layers with other substrates. At some stage, the substrate may be sawn to produce individual interposer pieces.

With the progressive stamping of the mold from its center to its periphery, as described above in connection with FIGS. 4–8, trapping of excess plastic material and/or air in the mold may be reduced or eliminated. As a result, high yields of interposers may be realized, and it may be possible to utilize a mold pattern that does not include channels or other features to accommodate flow of air or excess material. Consequently, the mold pattern may allow for tighter spacing of interposer features, so that the size of the interposers may be reduced, and more interposers may be produced from a single substrate. The cost of manufacturing interposers may thereby be reduced and/or manufacturing efficiency may be increased.

Figure 9:
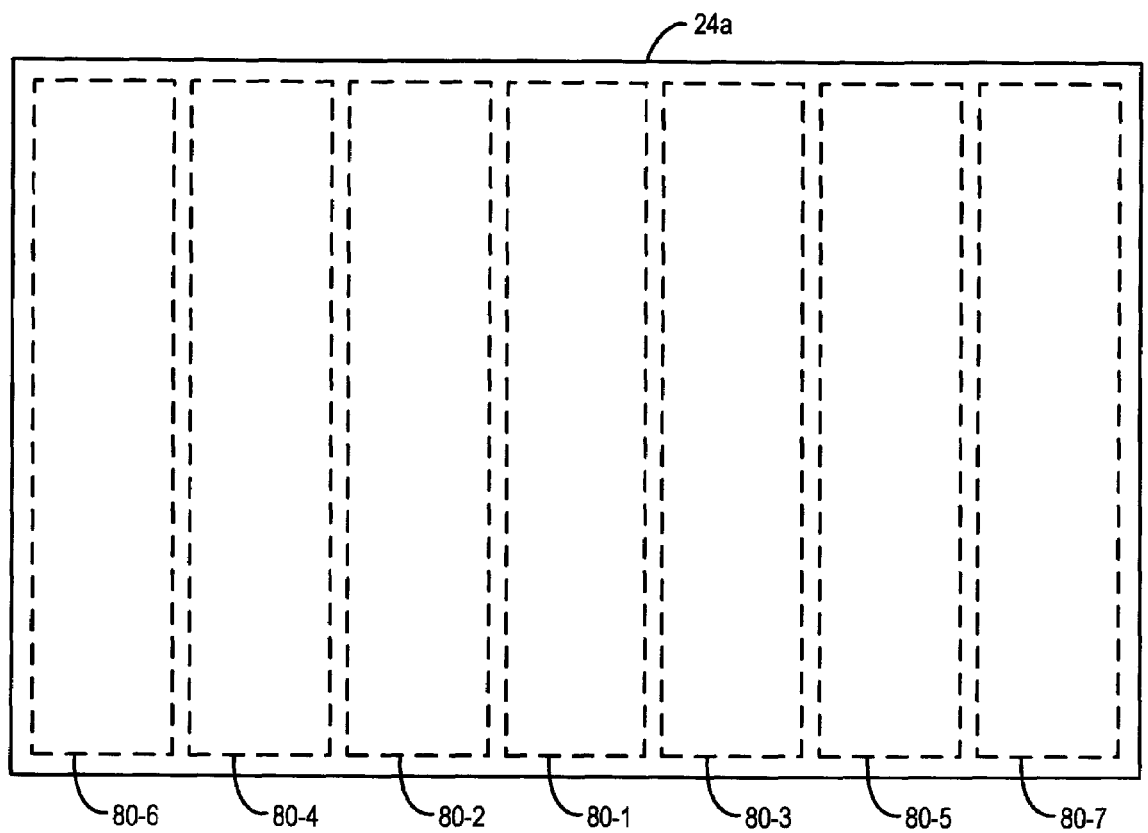
FIG. 9 is a schematic plan view showing another substrate upon which stamping may be performed together with footprints of individual stamps that may be part of another embodiment of the apparatus of FIG. 1.

In some embodiments, the substrate may be shaped like a disk with a diameter of about 150 mm and the mold and the combined footprints of the stamps may substantially correspond to the profile of the substrate. Other shapes and sizes of the substrate, of the mold and of the combined stamp footprint may alternatively be employed. For example, as illustrated in FIG. 9, a mold 24a having rectangular profile may be employed. Dashed line rectangles 80 in FIG. 9 represent respective footprints of individual stamps that may be included in another embodiment of the stamping apparatus 20. In such an embodiment, a progressive stamping operation may call for the stamps to be actuated in the following sequence: first, the stamp having footprint 80-1; then simultaneously the stamps having the footprints 80-2 and 80-3; followed simultaneously by the stamps having the footprints 80-4 and 80-5; and finally simultaneous actuation of the stamps having the footprints 80-6 and 80-7. As in the process of FIGS. 4–8, this stamping operation may proceed from the center of the mold to ends or outer edges thereof so that air and/or excess plastic material is not trapped but rather is allowed to escape toward the edge of the mold. In another alternative, the stamps having footprints as shown in FIG. 9 may be actuated in sequence from the left end of the mold to the right end of the mold, or from the right end of the mold to the left end of the mold. Stamps having the footprints shown in FIG. 9 may be used with molds and/or substrates that are circular or another shape that is not rectangular.

In other embodiments, modifications may be made to the stamping apparatus illustrated in FIGS. 1–3 and 5–8. For example, instead of circular and annular stamps, the stamps may be square/rectangular, and hollow squares/rectangles. Other shapes of stamps may also be used. The number of stamps may be two, three or five or more rather than the four stamps shown in the drawings. In some embodiments, the number of stamps may be 10 to 100 or more, as may be desired to minimize or eliminate trapping of air or excess plastic material in the mold.

In some embodiments, the mold used herein may be employed to form features on the plastic layer of the substrate that have a width of 60 to 80 microns or less.

In some embodiments each stamp, when fully actuated, may apply a pressure of about 150 pounds per square inch to the upper surface of the mold. Alternatively, a greater or lesser amount of pressure may be employed.

In the above-described embodiments, a progressive stamping process is applied to molding of a copper/plastic substrate as a stage in producing interposers. In other embodiments, progressive stamping may be applied to other pressure molding processes in regard to other types of substrates and/or to producing other types of items besides interposers.

As used in the appended claims, initially applying pressure to a second portion of a mold refers to an initial period of applying pressure to the second portion of the mold after applying pressure to a first portion of the mold.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. An apparatus comprising:
   a first stamp to apply pressure to a mold at a first portion of the mold; and
   a second stamp to apply pressure to the mold at a second portion of the mold that is adjacent to the first portion of the mold;
   wherein the mold is a microtool.

2. The apparatus of claim 1, further comprising a third stamp to apply pressure to the mold at a third portion of the mold that is adjacent to the second portion of the mold.

3. The apparatus of claim 2, further comprising a fourth stamp to apply pressure to the mold at a fourth portion of the mold that is adjacent to the third portion of the mold.

4. The apparatus of claim 2, wherein the second portion of the mold substantially surrounds the first portion of the mold and the third portion of the mold substantially surrounds the second portion of the mold.

5. The apparatus of claim 4, wherein the first stamp has a substantially circular footprint, the second stamp has a substantially annular footprint, and the third stamp has a substantially annular footprint.

6. The apparatus of claim 1, wherein the first stamp includes a step that extends from a side of the first stamp, and the second stamp includes an overhang that extends from a side of the second stamp, the overhang of the second stamp being positioned to contact from above the step of the first stamp.

7. The apparatus of claim 1, further comprising:
   a control that is operative to cause the first stamp to apply pressure to the first portion of the mold before causing the second stamp to apply pressure to the second portion of the mold.

8. A method comprising:
   applying pressure to a mold at a first portion of the mold without applying pressure to the mold at a second portion of the mold that is adjacent to the first portion of the mold; and
   after commencing to apply pressure to the mold at the first portion of the mold, applying pressure to the mold at the second portion of the mold;
   wherein the mold is a microtool.

9. The method of claim 8, wherein pressure is initially applied to the second portion of the mold without applying pressure to the mold at a third portion of the mold that is adjacent to the second portion of the mold;
   and further comprising:
   after commencing to apply pressure to the mold at the second portion of the mold, applying pressure to the mold at the third portion of the mold.

10. The method of claim 9, wherein pressure is initially applied to the third portion of the mold without applying pressure to the mold at a fourth portion of the mold that is adjacent to the third portion of the mold;
    and further comprising:
    after commencing to apply pressure to the mold at the third portion of the mold, applying pressure to the mold at a fourth portion of the mold.

11. The method of claim 9, wherein the second portion of the mold substantially surrounds the first portion of the mold and the third portion of the mold substantially surrounds the second portion of the mold.

12. The method of claim 11, wherein the first portion of the mold is substantially circular, the second portion of the mold is substantially annular, and the third portion of the mold is substantially annular.

13. An apparatus comprising:
    first means for applying pressure to a mold at a first portion of the mold without applying pressure to the mold at a second portion of the mold that is adjacent to the first portion of the mold; and
    second means for applying pressure to the mold at the second portion of the mold;
    wherein the first means includes a first stamp that has a step that extends from a side of the first stamp, and the second means includes a second stamp that has an overhang that extends from a side of the second stamp, the overhang of the second stamp being positioned to contact from above the step of the first stamp.

14. The apparatus of claim 13, wherein the second means is configured to apply pressure to the mold at the second portion of the mold without applying pressure to the mold at a third portion of the mold that is adjacent to the second portion of the mold;
    and further comprising:
    third means for applying pressure to the third portion of the mold.

15. The apparatus of claim 14, wherein the third means is configured to apply pressure to the mold at the third portion of the mold without applying pressure to the mold at a fourth portion of the mold that is adjacent to the third portion of the mold;
and further comprising:
fourth means for applying pressure to the fourth portion of the mold.

16. The apparatus of claim 14, wherein the second portion of the mold substantially surrounds the first portion of the mold and the third portion of the mold substantially surrounds the second portion of the mold.

17. The apparatus of claim 16, wherein:
the first means includes a first stamp that has a substantially circular footprint;
the second means includes a second stamp that has a substantially annular footprint; and
the third means includes a third stamp that has a substantially annular footprint.

18. The apparatus of claim 14, further comprising:
control means, coupled to the first, second and third means, for sequentially controlling the first, second and third means to:
downwardly actuate the first means;
downwardly actuate the second means after downwardly actuating the first means; and
downwardly actuate the third means after downwardly actuating the second means.

19. The method of claim 8, wherein the mold impresses a pattern on a plastic layer of a copper/plastic disk.

* * * * *